United States Patent [19]

Audibert et al.

[11] 4,384,151

[45] May 17, 1983

[54] PROCESS AND APPARATUS FOR THERMALLY CONVERTING USED OR WASTE TIRES TO MATERIALS USABLE AS FUELS

[75] Inventors: François Audibert, Ecully; Pierre Trambouze, Caluire, both of France; Hugo Van Landeghem, deceased, late of Oytier Saint Oblas, France, by Heynderick R. Van Landeghem, legal representative

[73] Assignee: Institut Francais du Petrole, Rueil-Malmaison, France

[21] Appl. No.: 306,815

[22] Filed: Sep. 29, 1981

[30] Foreign Application Priority Data

Sep. 29, 1980 [FR] France .............................. 80 20884

[51] Int. Cl.³ .............................................. C07C 4/00
[52] U.S. Cl. .................................... 585/241; 585/240

[58] Field of Search ................................ 585/241, 240

[56] References Cited

U.S. PATENT DOCUMENTS 4,171,345 10/1979 Toshev et al. ...................... 585/241
4,175,211 11/1979 Chen et al. .......................... 585/241

FOREIGN PATENT DOCUMENTS 2404800 2/1974 Fed. Rep. of Germany ...... 585/241

*Primary Examiner*—Delbert E. Gantz
*Assistant Examiner*—A. Pal
*Attorney, Agent, or Firm*—Millen & White

[57] ABSTRACT

The process of the invention comprises heating coarsely cut or whole used or waste tires in an oven while spraying thereon a stream of heavy oil, recycling at least a part of this oil and discharging the oil formed by decomposition of the tires as output product.

8 Claims, 1 Drawing Figure

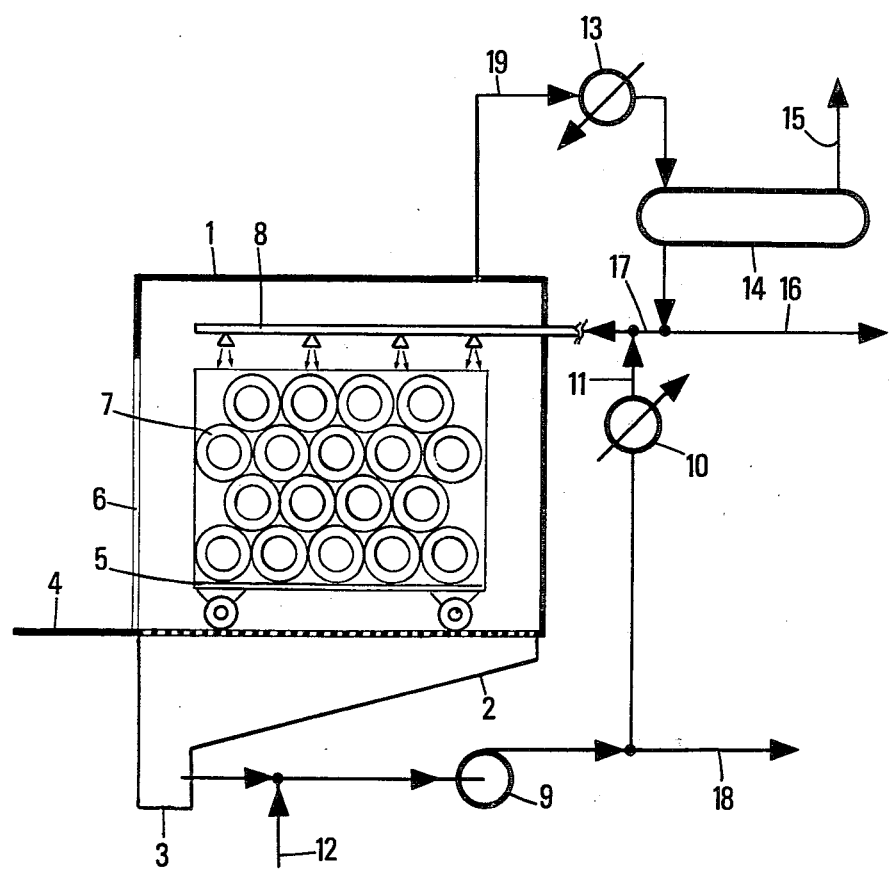

PROCESS AND APPARATUS FOR THERMALLY CONVERTING USED OR WASTE TIRES TO MATERIALS USABLE AS FUELS

BACKGROUND OF THE INVENTION

The present invention, which has been developed with the participation of "Manufacture Française des Pneumatiques MICHELIN" concerns the conversion of used or waste tires to liquid and gaseous fuels.

The conversion of used tires has become a major problem since the most common way to get rid of them is to throw them out or, in some cases, to burn them in open air, thus releasing substantial amounts of carbon and polluting gas in the atmosphere. Other applications have been considered but they are unable, separately or not, to consume the huge amount of waste tires. The problem is the more serious as the number of waste tires in the world continuously increases and presently reaches several hundred millions of units per year.

A known conversion technique is pyrolysis. It is effected at a particularly high temperature and its relative complexity requires use of production units of large capacity, hardly compatible with a limited supply by sector due to the high gathering and transportation costs.

Another known technique consists of cutting the tires into fragments of various sizes, of heating these fragments in a heavy oil at a temperature from about 300° to 500° C. and of recovering the resultant products. The tire cutting step alone corresponds to a substantial part of the cost of the operation, particularly when effected on tires with metallic casings or on large size tires.

The treatment of whole tires by an immersion technique would require the use of a high quantity of oil, amounting to about 8 to 10 times the weight of the tires. The use of such an amount of oil results in serious disadvantages: delays in starting the installation and power consumption for heating the oil up to the reaction temperature, particularly in batchwise operated installations which are less adapted to heat recovery than continuously operated units.

Another difficulty arises from the foam formation in the apparatus where the tires are heated, which necessitates proceeding slowly in order to avoid clogging the apparatus. However the length of the treatment time required at high temperature too largely favours cracking and formation of gas to the detriment of liquid fuel.

OBJECTS OF THE INVENTION

The process of the invention is intended to provide for a mode of operation which is less costly than those of the prior art, which is better adapted to local scale exploitation and which reduces or avoids the above mentioned disadvantages, particularly the need to cut of the tires, the accumulation of foams and the requirement of a large gathering network.

SUMMARY OF THE INVENTION

According to the process of the invention, rough fragments or, preferably, whole used tires are treated by means of a heavy oil flowing thereon, without immersing them in a bath of said oil.

The present process has several advantages:

investment cost reduced by the optional omission of the cutting step use of less oil, with consequently a smaller consumption of heating power;

higher rate of gum decomposition, the flow technique improving the solid-liquid transfer;

removal of the disadvantages due to the accumulation of foams, as a result of the lower relative volume of liquid phase.

BRIEF DESCRIPTION OF THE DRAWING

The process of the invention is illustrated by the accompanying FIGURE which must not however be considered as limiting the scope thereof.

DETAILED DISCUSSION

A suitable apparatus for effecting the present process comprises an enclosure 1 whose lower part 2 is inclined and leads to a sump tank 3. A roller-track 4 is provided to facilitate entry of a carriage 5 inside the enclosure, by actuation of a tight door 6. The walls of the carriage are so designed as to premit passage of the flow of oil while retaining the tires 7; these walls preferably consist of a wire lattice.

One or more spray tubes such as tube 8 are placed at the upper part and/or on the sides of enclosure 1; they are oriented towards the location of the tires.

The operation is as follows:

After a carriage, loaded with used or waste tires, has been placed in the enclosure and its door closed, the pump 9 is operated so as to suck the oil contained in the sump tank 3 and to supply it through heater 10 and line 11 to the spray tube 8. Fresh oil may be supplied through line 12. Oil is sprayed on the tires, freely flows thereover and is collected in tank 3 wherefrom it is recirculated by pump 9. When the tires have attained their decomposition temperature, about 350° to 500° C., the volatile compounds distill through line 19. They are condensed in the cooler 13 and fed to the drum 14. The gases escape through line 15 and the liquid phase may be discharged through line 16 and/or recycled totally or partially through line 17.

The dissolution and/or decomposition of the tires results in the production of oil. Accordingly, a portion of the circulating oil is discharged through line 18. It may be advantageous to dilute the oil of line 18 with a portion of the condensed phase from line 16, preferably after withdrawal therefrom of the fraction boiling within the gasoline range. The discharged oil is one of the output products of the process. It may thus be used as fuel in a heater or for any other purpose. A portion of the oil may however be kept for addition to fresh oil in a subsequent operation.

Once the operation is completed, the carriage which contains the undecomposed casings of the tires is taken out and a new load of used or waste tires is introduced under adequate safety conditions.

For carrying out the process, there can be used for example, 1 to 8 parts by weight of oil per part by weight of tires, but, preferably, 1.5 to 4 parts by weight of oil per part by weight of tires; this small proportion is one of the advantages of the process in view of the fact that with whole tires the usual treatment requires 8 to 10 parts by weight of oil per part by weight of tire to form an immersion bath according to the known technique.

It has been found that the spraying rate has a substantial effect in the process. Rates of 5 to 100 m$^3$/h, preferably 10 to 50 m$^3$/h, per ton of tires, are preferred. Too low rates result in irregularities of the treatment and in coke deposit in the heat exchangers, whereas too high rates result in an increased operating cost and in a more rapid wear of the installation, without additional advantage for the treatment itself.

The oil may be any hydrocarbon oil, provided it remains liquid at the operating temperature. Any hydrocarbon oil proposed in the prior art may be convenient although the preferred oils are those containing at least 20% of aromatic or naphthenic hydrocarbons.

Although the use of carriages is preferred in view of their easy use, any other loading and unloading equipment may also be used, for example an elevated conveyor, including a loading in bulk.

The invention is neither limited to the treatment of a particular type of tire, nor to particular operating conditions, the operating conditions being those usually proposed in the prior art.

EXAMPLE

The whole tires to be treated are arranged in a basket carried in a carriage which is introduced into an oven. An inert atmosphere (nitrogen or steam) is established and a hydrocarbon oil of aromatic type is circulated so as to supply the heat required for the degradation of the tires. The oil flow rate is 25 m$^3$ per ton of tires. The temperature is 390° C. The volatile products are allowed to distill and the liquid fractions are condensed (gasoline and heavier distillates). When the operation is completed, the circulating oil is allowed to cool down and is diluted with the condensed fractions distilling after gasoline.

The properties of the produced combustible oil are reported below:

| | |
|---|---|
| Viscosity at 50° C. (mm$^2$/s) | $2.83 \times 10^{-4}$ |
| pour point (°C.) | −12 |
| Conradson carbon (% by weight) | 15 |
| zinc (% by weight) | 0.56 |
| S (% by weight)* | 3.8 |

*Depends to a very large extent on the contact oil. The oil used for the test had a sulfur content of 4.9%

It is claimed:

1. In a process for converting used or waste tires to liquid and gaseous products, wherein the tires are heated in contact with a hydrocarbon oil at a temperature of 300°–500° C., and the resultant liquid and gaseous products are separated from the undecomposed casings and recovered, the improvement comprising spraying a hydrocarbon oil heated to 350°–500° C. onto whole or coarsely cut tires, using spray means, in an amount of 1.5–4 parts by weight of oil per part by weight of tires, the tires being contained in a container whose walls permit passage of oil therethrough while retaining the tires; condensing volatile liquids produced by decomposition of the tires and recovering the resultant condensate; collecting the oil in a collecting tank after it has flowed over the tires and out of the container; and recirculating at least a portion of the collected oil to the spray means at an hourly rate of 5–100 cubic meters of oil per metric ton of tires, the recirculation being continued for a time sufficient to convert the tires to liquid and gaseous products, leaving the undecomposed casings in the container; whereby less oil and less heat are required than would be required to immerse the tires in a bath of the oil, a higher rate of gum decomposition is achieved, and foam accumulation is reduced.

2. A process according to claim 1, wherein the rate of circulation of the oil is 10–50 m$^3$/h per ton of tires.

3. A process according to claim 1, wherein a portion of the collected oil is recirculated and another portion is discharged as output product.

4. A process according to claim 3 wherein at least a portion of the condensate is admixed with the discharged oil.

5. A process according to claim 1, wherein the container in which the tires are arranged is a carriage.

6. A process according to claim 1, wherein the conversion is effected in an enclosure provided with spray means at its top and on at least a portion of its walls, and comprising at its bottom part a sump tank for collecting the oil; and wherein pump means are provided to recirculate the collected oil to the spray means.

7. A process according to claim 1, wherein whole tires are treated without being cut into pieces.

8. A process according to claim 4, wherein said condensate is fractionated, a gasoline fraction is separated and recovered, and at least a portion of the remaining condensate fractions are admixed with the discharged oil.

* * * * *